United States Patent
Petre

(10) Patent No.: US 6,648,623 B2
(45) Date of Patent: *Nov. 18, 2003

(54) QUICK CHANGE BLOW MOLD SHELL ASSEMBLY

(75) Inventor: Patrick Petre, Caubille sur Mer (FR)

(73) Assignee: Sidel, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,558

(22) Filed: Feb. 5, 1999

(65) Prior Publication Data

US 2003/0124212 A1 Jul. 3, 2003

(51) Int. Cl.[7] .............................................. B29C 49/48
(52) U.S. Cl. ........................ 425/195; 249/102; 425/522; 425/541
(58) Field of Search ............................ 249/79, 80, 102, 249/165, 168; 425/522, 182, 183, 195, 529, 541

(56) References Cited

U.S. PATENT DOCUMENTS

| | | |
|---|---|---|
| 417,176 A | 12/1889 | Haines |
| 467,881 A | 1/1892 | Fisher |
| 1,409,591 A | 3/1922 | Schavoir |
| 2,790,994 A | 5/1957 | Cardot et al. |
| 2,959,812 A | 11/1960 | Allen |
| 3,191,225 A | 6/1965 | Polka |
| 3,380,121 A | 4/1968 | Chittenden et al. |
| 3,601,858 A | 8/1971 | Blanchard |
| 3,632,249 A | 1/1972 | Pearson |
| 3,651,186 A | 3/1972 | Hall |
| 3,753,641 A | 8/1973 | Turner et al. |
| 3,768,948 A | 10/1973 | Horberg, Jr. et al. |
| 3,784,344 A | 1/1974 | Korsch |
| 3,802,823 A | 4/1974 | Doughty et al. ............. 425/532 |
| 3,807,928 A | 4/1974 | Horberg, Jr. et al. |
| 3,843,286 A | * 10/1974 | Horberg, Jr. et al. ....... 425/183 |

(List continued on next page.)

FOREIGN PATENT DOCUMENTS

| | | |
|---|---|---|
| DE | 1916129 | 10/1969 |
| DE | 2307727 | 8/1973 |
| DE | 2545130 A1 | 4/1977 |

(List continued on next page.)

OTHER PUBLICATIONS

Declaration and Translation by Hiromi Tanimoto of Japanese Utility Model Application HEI 1–60725.

(List continued on next page.)

*Primary Examiner*—Robert Davis
(74) *Attorney, Agent, or Firm*—Alston & Bird LLP

(57) ABSTRACT

A quick change blow mold shell assembly is disclosed. The blow mold shell assembly includes a carrier plate and a blow mold half shell for being fastened to the carrier plate. A first slotted opening is defined in an edge of the carrier plate, and a corresponding second slotted opening is defined in an edge of the blow mold half shell. The first and second openings are placed in registry with one another as the shell is positioned on its carrier plate. A fastener clip is also provided, the clip being sized and shaped to be received in each one of the respective openings, and being constructed and arranged to align the first and second openings with respect to one another, to draw the shell snugly against the carrier plate, and to fasten the shell to its carrier plate as a fastener is passed through the clip and into the carrier plate.

31 Claims, 4 Drawing Sheets

U.S. PATENT DOCUMENTS

| | | | |
|---|---|---|---|
| 3,854,855 A | 12/1974 | Pollock et al. .............. | 425/142 |
| 3,857,660 A | 12/1974 | Flynn et al. | |
| 3,871,611 A | 3/1975 | Taketa | |
| 3,993,427 A | 11/1976 | Kauffman et al. | |
| 4,009,979 A | 3/1977 | Martin | |
| 4,035,463 A | 7/1977 | Rosenkranz et al. | |
| 4,046,498 A | 9/1977 | Appel et al. | |
| 4,072,456 A | 2/1978 | Appel et al. | |
| 4,092,097 A | 5/1978 | Appel et al. | |
| 4,117,050 A | 9/1978 | Appel et al. | |
| 4,120,636 A | 10/1978 | Appel et al. | |
| 4,151,976 A | 5/1979 | Schurman | |
| 4,213,750 A | 7/1980 | Kubota et al. | |
| 4,233,022 A | 11/1980 | Brady et al. | |
| 4,268,242 A * | 5/1981 | Natter ........................ | 425/182 |
| 4,318,882 A | 3/1982 | Agrawal et al. | |
| 4,357,288 A | 11/1982 | Oas et al. | |
| 4,472,128 A | 9/1984 | Ruhl | |
| 4,500,275 A | 2/1985 | Ruhl | |
| 4,568,263 A | 2/1986 | Ruhl | |
| 4,701,121 A | 10/1987 | Jakobsen et al. | |
| 4,702,456 A | 10/1987 | Von Holdt | |
| 4,714,421 A | 12/1987 | D'Agostino | |
| 4,822,543 A | 4/1989 | Iizuka et al. | |
| 4,861,542 A | 8/1989 | Shepps ........................ | 415/532 |
| 5,096,404 A | 3/1992 | Janos et al. ................. | 425/190 |
| 5,116,450 A | 5/1992 | Spoo et al. ................. | 425/185 |
| 5,255,889 A | 10/1993 | Collette et al. | |
| 5,262,116 A | 11/1993 | Von Holdt, Sr. | |
| 5,284,432 A | 2/1994 | Wurzer ........................ | 425/195 |
| 5,288,222 A | 2/1994 | Wieser ........................ | 425/190 |
| 5,295,804 A | 3/1994 | Dinnan | |
| 5,326,250 A | 7/1994 | Doudement ................. | 425/541 |
| 5,332,384 A | 7/1994 | Abramat | |
| 5,346,386 A | 9/1994 | Albrecht et al. | |
| 5,350,289 A | 9/1994 | Martin ........................ | 425/190 |
| 5,358,396 A | 10/1994 | Antonius Giesen | |
| 5,411,698 A | 5/1995 | Mero et al. | |
| 5,439,368 A | 8/1995 | Martin ........................ | 425/190 |
| 5,458,825 A | 10/1995 | Grolman et al. | |
| 5,551,860 A | 9/1996 | Budzynski et al. ......... | 425/532 |
| 5,551,861 A | 9/1996 | Baldi ........................ | 425/527 |
| 5,556,648 A | 9/1996 | Budzynski et al. ......... | 425/532 |
| 5,683,729 A | 11/1997 | Valles ........................ | 425/526 |
| 5,750,161 A | 5/1998 | Schock, Jr. et al. | |
| 5,968,560 A | 10/1999 | Briere et al. ................. | 425/541 |
| 6,113,377 A * | 9/2000 | Clark ........................ | 425/195 |

FOREIGN PATENT DOCUMENTS

| | | |
|---|---|---|
| DE | 2545131 A1 | 4/1977 |
| DE | 2545132 A1 | 4/1977 |
| DE | 2545134 A1 | 4/1977 |
| DE | 3613543 C1 | 12/1986 |
| DE | 3934495 C1 | 12/1990 |
| EP | 565917 A1 | 10/1993 |
| FR | 2057196 A1 | 5/1971 |
| FR | 2613979 A1 | 10/1988 |
| FR | 2646802 A1 | 11/1990 |
| FR | 2653058 A1 | 4/1991 |
| FR | 2659265 A1 | 9/1991 |
| GB | 1230090 | 4/1971 |
| GB | 1425638 | 2/1976 |
| GB | 1577034 | 10/1980 |
| GB | 2240300 A | 7/1991 |
| JP | 58-36418 A | 3/1983 |
| JP | 60-011 316 A | 1/1985 |
| JP | 63-227 315 A | 9/1988 |
| JP | HEI 1-60725 U | 4/1989 |
| JP | 2-82 436 U | 6/1990 |
| JP | 5-169522 A | 7/1993 |
| WO | WO 94/03320 A1 | 2/1994 |

OTHER PUBLICATIONS

"Quick–Change Systems Add to Blow Molders Market Reach," by Patrick A. Toenmeier, Modern Plastics International, Aug. 1991 (pp. 30–31).

Patent Abstracts of Japan, vol. 12, No. 286 (M–727), Aug. 5, 1988 (Abstract of Japanese Reference 63–062, 710, dated Mar. 19, 1988).

Wentworth Drawings Set 1 (No Date).
Wentworth Drawings Set 2 (No Date).
Wentworth Drawings Set 3 (No Date).
Wentworth Drawings Set 4 (No Date).
Wentworth Drawings Set 5 (No Date).
Wentworth Drawings Set 6 (No Date).
Wentworth Drawings Set 7 (No Date).
Wentworth Drawings Set 8 (No Date).
Wentworth Drawings Set 9 (No Date).
Wentworth Drawings Set 10 (No Date).
Wentworth Drawings set 11 (No Date).
Wentworth Drawings Set 12 (No Date).
Wentworth Drawings Set 13 (No Date).
Wentworth Drawings Set 14 (No Date).
Wentworth Drawings Set 15 (No Date).
Wentworth Drawings Set 16 (No Date).
Wentworth Drawings Set 17 (No Date).
Wentworth Drawings Set 18 (No Date).
Wentworth Drawings Set 19 (No Date).
Wentworth Drawings Set 20 (No Date).
Wentworth Drawings Set 21 (No Date).
Wentworth Drawings Set 22 (No Date).
Wentworth Drawings Set 23 (No Date).
Wentworth Drawings Set 24 (No Date).
Wentworth Drawings Set 25 (No Date).
Wentworth Drawings Set 26 (No Date).
Wentworth Drawings Set 27 (No Date).
Wentworth Drawings Set 28 (No Date).
Wentworth Drawings Set 29 (No Date).
Wentworth Drawings Set 30 (No Date).
Wentworth Drawings Set 31 (No Date).
Wentworth Drawings Set 32 (No Date).
Wentworth Drawings Set 33 (No Date).
Wentworth Drawings Set 34 (No Date).
Wentworth Drawings Set 35 (No Date).
Wentworth Drawings Set 36 (No Date).
Wentworth Drawings Set 37 (No Date).
Wentworth Drawings Set 38 (No Date).
Wentworth Drawings Set 39 (No Date).
Wentworth Drawings Set 40 (No Date).
Wentworth Drawings Set 41 (No Date).
Wentworth Drawings Set 42 (No Date).
Wentworth Drawings Set 43 (No Date).
Wentworth Drawings Set 44 (No Date).
Wentworth Drawings Set 45 (No Date).
Wentworth Drawings Set 46 (No Date).
Wentworth Drawings Set 47 (No Date).
Wentworth Drawings Set 48 (No Date).
Wentworth Drawings Set 49 (No Date).
Wentworth Drawings Set 50 (No Date).
Wentworth Drawings Set 51 (No Date).
Wentworth Drawings Set 52 (No Date).
Wentworth Drawings Set 53 (No Date).
Wentworth Drawings Set 54 (No Date).

Wentworth Drawings Set 55 (No Date).
Wentworth Drawings Set 56 (No Date).
Wentworth Drawings Set 57 (No Date).
Wentworth Drawings Set 58 (No Date).
Wentworth Drawings Set 59 (No Date).
Wentworth Drawings Set 60 (No Date).
Wentworth Drawings Set 61 (No Date).
Wentworth Drawings Set 62 (No Date).
Wentworth Drawings Set 63 (No Date).
Wentworth Drawings Set 64 (No Date).
Wentworth Drawings Set 65 (No Date).
Wentworth Drawings Set 66 (No Date).
Wentworth Drawings Set 67 (No Date).
Wentworth Drawings Set 68 (No Date).
Wentworth Drawings Set 69 (No Date).
Wentworth Drawings Set 70 (No Date).

* cited by examiner

QUICK CHANGE BLOW MOLD SHELL ASSEMBLY

FIELD OF THE INVENTION

This invention relates in general to blow mold machinery, and to the blow molding of containers. More particularly, this invention relates to an improved blow mold shell assembly having a blow mold shell and carrier plate in which the blow mold shell is adapted to be changed out for use in a quick and expedient fashion, while also aligning and fastening the blow mold shell to its carrier plate.

BACKGROUND OF THE INVENTION

A large number of beverages, to include a wide variety of food products, are packaged in plastic bottles and/or containers. Plastic has proven to be a useful material as it can be readily adapted and formed into a variety of shapes and sizes, as well as designs. Moreover, a variety of plastics can be used to form bottles to package beverages, for example, as well as containers for semi-solid food products to include mayonnaise and peanut butter. Such plastics include polyethylene, polyvinylchloride, and polyethylene terephthalate also known as "PET" to those skilled in the industry.

The use of PET has grown due to the ease with which the material can be formed through a blow molding operation, either injection blow molding, stretch blow molding, or extrusion blow molding. Moreover, PET has the benefit of being lightweight, transparent, and has a superior resistance to impact, heat and pressure and lastly, it is 100% recyclable.

The shape, size and/or design of the molded PET container is a result of the design machined into a blow mold shell assembly. The shell assembly will typically include two opposed mold shell halves, each of which is machined, typically, from a ductile and durable metallic material, such as steel, to include stainless steel, and more recently aluminum. Aluminum offers the advantage of being lighter in weight, and easier to machine, although it can be more easily damaged. Once the mold shell halves are fabricated, they are then each affixed to a separate one of a pair of opposed support plates, also known as carrier plates or shell holders, which are themselves affixed to the blow mold machine, and more particularly to a shell opening and closing device.

In the blow mold process, a heated PET preform is positioned between the mold shell halves, whereupon the mold shell halves are then closed about the preform by the shell opening and closing device, at which point in time the preform is stretched, and compressed air or other suitable gases are passed into the preform such that it expands and takes on the shape of the mold cavity, and thus the container defined by the mold shell halves and an adjoining base portion of the mold which is moved into position as the shell halves close about the preform.

The known types of blow mold machines used for the process include linear or straight line blow mold machines which move the blow mold shells along a straight line toward and away from one another, as disclosed in U.S. Pat. No. 5,284,432 to Wurzer, and U.S. Pat. No. 5,551,861 to Baldi. The newer generation of blow molding machines are rotary blow mold machines, such as those shown in U.S. Pat. No. 3,854,855 to Pollock, et al.; U.S. Pat. No. 4,861,542 to Oles, et al.; U.S. Pat. Nos. 5,551,860 and 5,556,648, both to Budzynski, et al.; and U.S. Pat. No. 5,683,729 to Valles, which patent is assigned to Sidel S. A., the parent company of the assignee of this application.

In order to make a variety of containers in differing shapes, sizes and/or designs, it is necessary to "cut" molds for each such specific shape, size, and/or design. In order to produce a variety of shapes, sizes and designs among these blow mold containers, therefore, a container manufacturer or food packager can either have a machine dedicated to producing a certain type of container, or will be required to remove and replace differing blow mold shell sets, i.e. matching blow mold shell halves and the base assembly, from the blow mold machine when changing over from producing containers of a first size to a second size, for example. In a straight line blow mold machine such as that disclosed in the '861 patent to Baldi or the '432 patent to Wurzer, this is relatively easy to accomplish in that there typically is an adequate amount of room for a machine service technician to gain access to the molds, remove them from their carrier plates, and then install the new shell halves. However, on rotary blow mold machines, this becomes more of a problem.

U.S. Pat. No. 5,326,250 to Doudement, also assigned to the parent concern of the assignee of this invention, discloses an opening and closing mechanism for use in opening and closing a blow mold half shells on a rotary blow mold machine. As shown in Doudement, the mechanism is configured as a clam shell arrangement having a fixed pivot about which the mold shell halves will be pivoted for opening and closing. The carrier plates of the shell assembly will be affixed to the opening and closing mechanism, and in turn the blow mold shell halves will be removed from and replaced on their respective carrier plates based on the size, shape, or design of the container being produced.

The problem faced however, by machine service technicians is that as this is a clam shell type of opening and closing mechanism, there is a limited amount of space available for gaining access, to any threaded fasteners, or other fasteners which may be used for securing the blow mold shell halves to the holder or carrier plates. The changing over of the blow mold shell halves thus becomes a laborious and tedious process, made all the more difficult by the close confines within which these machines are typically housed. Thus, there is a need for an improved blow mold shell assembly in which the blow mold shells can be quickly and easily installed, removed, and replaced, as needed, to improve production efficiency and reduce the amount of machine downtime incurred when changing over the blow mold shell sets.

Another problem faced when changing over blow mold shell sets, more so on a clam shell type of holder arrangement on a rotary blow mold machine than with a straight line machine, is the alignment of the shell halves with their respective carrier plates. As known to those of skill in the art, a cooling or heat-treating fluid is oftentimes passed through conduits or channels defined in the carrier plate, the carrier plate in turn having ports which will be positioned in registry with inlet and discharge ports, respectively, defined in the blow mold shell halves. The precise alignment of the shell halves on the carrier plates is thus necessary in order to ensure that the cooling or heat-treating fluid does not leak out over the molds during the blow mold process, leading to undesirable or unacceptable containers, all of which tends to decrease machine efficiency. What is needed, therefore, is an improved blow mold shell assembly in which not only can the blow mold shells be quickly and easily removed and replaced, but which will also precisely align the blow mold shell with its respective carrier plate during the changeover process.

An additional problem faced by blow mold container manufacturers deals with the use of the newer generation of mold shell materials, for example aluminum. A great many blow mold shell halves are threadably affixed to their carrier plates by passing a threaded fastener through the carrier plate and into the mold shell, or by using clamps or straps which are threadably passed into both the carrier plate and the mold shell halve. The problem faced with using softer metals, for example aluminum, is that a machine service technician may over tighten a fastener such that the threads within the shell become stripped or destroyed, necessitating that the shell be removed from use and retapped, if possible, as the shell will no longer be securely fixed to its carrier plate, nor will it remain in a fixed position on its carrier plate during the high operating speeds employed by rotary blow mold machines. Moreover, due to the cost of machining blow mold shell halves, it is desirable that the service life of the shell half be extended for as long a time period as possible. What is needed, therefore, is an improved quick change blow mold shell assembly which will quickly and easily secure a blow mold shell half to its respective carrier plate without requiring the use of threaded fasteners passed into the blow mold shell.

SUMMARY OF THE INVENTION

The present invention provides an improved quick change blow mold shell assembly which overcomes some of the design deficiencies of the known blow mold shell assemblies. This invention provides a simple, efficient, and cost effective quick change blow mold shell assembly for use on the known types of blow mold machinery, and with which blow mold shell halves can be quickly, easily, and accurately changed out when it is desired to change the blow mold shells during a product size or design changeover, especially on rotary blow mold machines.

The improved quick change blow mold shell assembly of this invention thus includes a carrier plate adapted for being fastened to a blow mold shell assembly opening and closing device of the type known in the art. A first opening is defined in an edge of the carrier plate. The invention also includes a blow mold shell, or more preferably a half shell, having a second opening defined in an edge thereof. The first and second openings of the carrier plate and the half shell, respectively, are placed in registry with one another as the shell is positioned on its carrier plate for being mounted to a blow mold machine. A fastener clip sized and shaped to be received in each one of the respective openings defined in the carrier plate and the half shell, respectively, is provided. The fastener clip is constructed and arranged to align the first and second openings with respect to one another, thus aligning the shell with its carrier plate, while simultaneously drawing the shell snugly against its carrier plate as a fastener is passed through the clip and into the carrier plate for fastening the shell to its carrier plate.

The fastener clip is substantially U-shaped, and has a first leg and a spaced second leg. Each leg extends in a lengthwise direction away from a body portion of the clip, and each leg is tapered in its lengthwise direction. It is anticipated that the legs will be tapered at an angle of approximately 15°. In addition, each of the legs is beveled along the spaced parallel side edges of the length of the tapered surface.

In a preferred embodiment of the invention, each of the first and second openings defined in the carrier plate and the half shell, respectively, will also have a tapered surface sized complimentarily to the taper of the respective leg of the clip received therein, each such taper surface also being complimentarily beveled so that the clip progressively aligns the first and second openings with respect to one another, and progressively draws the shell and the carrier plate toward one another as the fastener, preferably an elongate threaded fastener, is passed through the fastener clip and into a threaded opening defined in the carrier plate.

It is anticipated that the half shell can be either a single or dual cavity blow mold shell. Moreover, in addition to the first and second openings defined in the top edges of the carrier plate and half shell, respectively, it is anticipated that additional openings, provided as corresponding pairs of openings, one each in the carrier plate and the half shell, may be provided along the side edges thereof, as desired, each such pair of openings being provided with one of the fastener clips as described above.

The openings defined in the edges of the carrier plate and half shell are formed as recessed slotted openings, sized and shaped such that as the fastener clip is received in such openings, it fits substantially flush with respect to the outwardly facing surfaces of the fastened half shell and carrier plate.

In a second embodiment, the invention includes a blow mold shell assembly for use with a known type of blow mold machine, the machine having a known type of clam shell style blow mold shell opening and closing mechanism to which the blow mold assembly is mounted. So provided, this embodiment of the invention will include first and second carrier plates adapted to be separately affixed to the blow mold shell opening and closing mechanism. First and second blow mold half shells are also provided for being separately and removably fastened to each respective carrier plate.

A first slotted opening is defined in a top edge of each carrier plate, and a corresponding second slotted opening is defined in the top edge of each half shell. The first and second openings are placed in registry with one another as the respective half shells are placed on their carrier plates, whereupon a fastener clip, as described above, one being provided for each pair of the first and second openings described, is received in each one of the openings of each pair of openings, and is constructed and arranged to align and draw each half shell snugly against its respective carrier plate as a fastener is passed through the clip and into its respective carrier plate.

It is, therefore, an object of the present invention to provide an improved quick change blow mold shell assembly.

Yet another object of the present invention is to provide an improved quick change blow mold shell assembly which is simple in design and construction, is rugged and durable in use, and is easy to use.

It is to these objects, as well as to the other objects, features, and advantages of the present invention, which will become apparent upon reading the specification, when taken in conjunction with the accompanying drawings, to which this invention is directed.

DETAILED DESCRIPTION OF THE PREFERRED EMBODIMENTS

Figure 1:
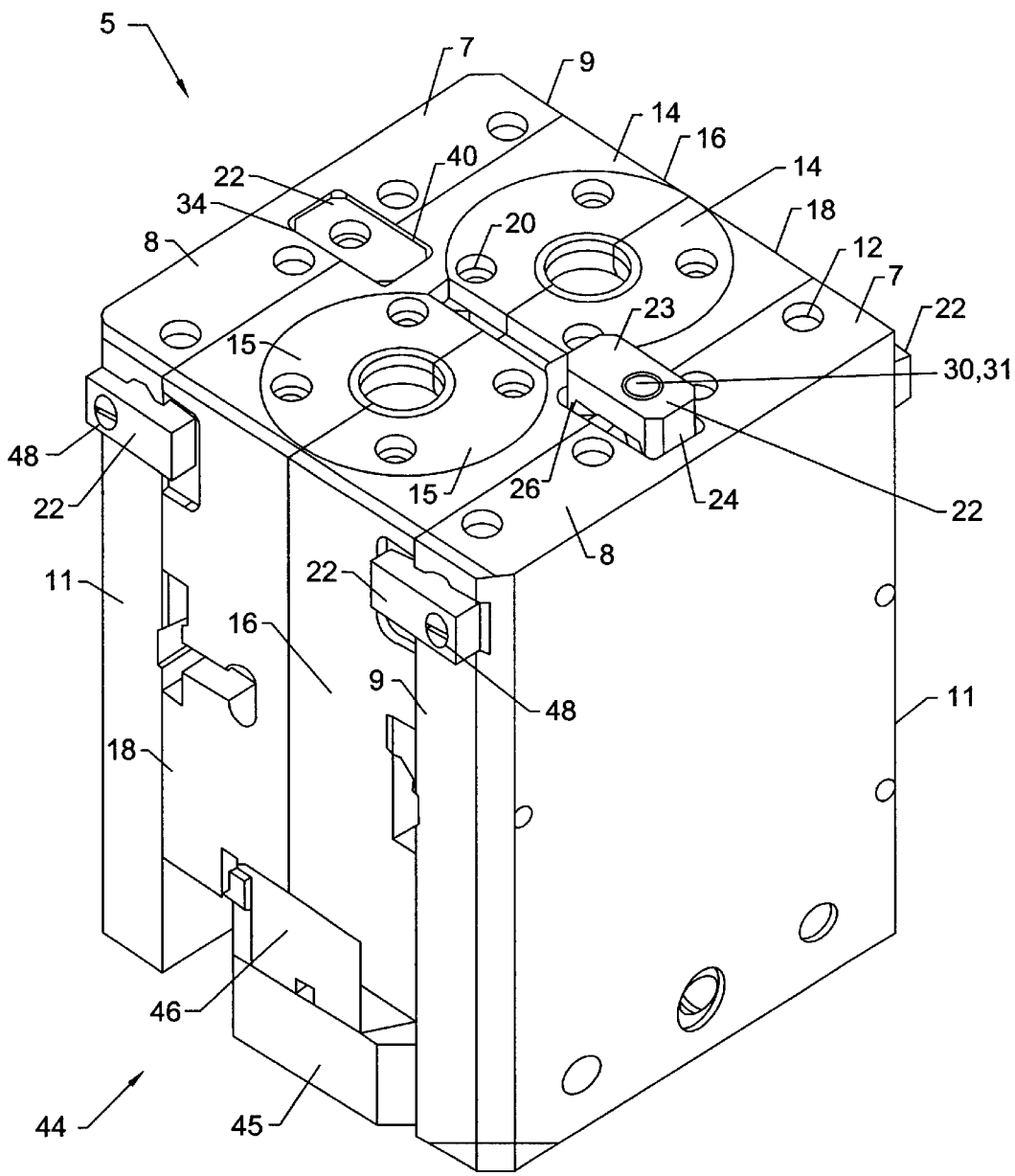
FIG. 1 is perspective illustration of a blow mold shell assembly of the present invention.

The present invention will now be described more fully hereinafter with reference to the accompanying drawings, in which like reference numerals indicate like parts throughout the several views, and in which preferred embodiments are shown. It is understood by those skilled in the art that this invention may be embodied in many different forms, and should not be construed as being limited to the embodiments set forth herein. Rather, the embodiments set forth herein are provided so that the disclosure will be thorough and complete, and which embodiments will fully convey the scope of the invention to those skilled in the art.

Referring now to FIG. 1, a preferred embodiment of blow mold shell assembly 5 is illustrated. The blow mold shell assembly is provided for use on the known types of blow mold machines, and more preferably for use on a rotary type of blow mold machine, as described in U.S. Pat. No. 5,683,729 to Valles entitled "Apparatus For Making Containers by Blow Molding Plastic Parisons"; and U.S. Pat. No. 5,326,250 to Doudement, entitled, "Opening and Closing Mechanism for Portfolio Blowing and Blowing-Stretching Mold", both of which are incorporated herein fully by this reference.

As such, blow mold shell assembly 5 is provided with a pair of carrier plates 7 for being fastened to an opening and closing mechanism of the type illustrated in the '250 patent to Doudement. As the device of Doudement is fully disclosed and described in the '250 patent, it is not illustrated in FIG. 1, nor described in greater detail herein.

Each of carrier plates 7 is substantially identical, and includes a top edge 8, and a pair of spaced parallel side edges 9, 11 extending downwardly away from the top edge. In known fashion, a series of cooling fluid openings 12 are defined in the top edge of the carrier plates and in communication with suitable conduits (not illustrated) so that a cooling fluid, as known, may be circulated through the carrier plate during the blow molding operation for the purposes of heat treating and/or cooling the blow mold shells, and/or the PET parisons during the molding process.

Figure 2:
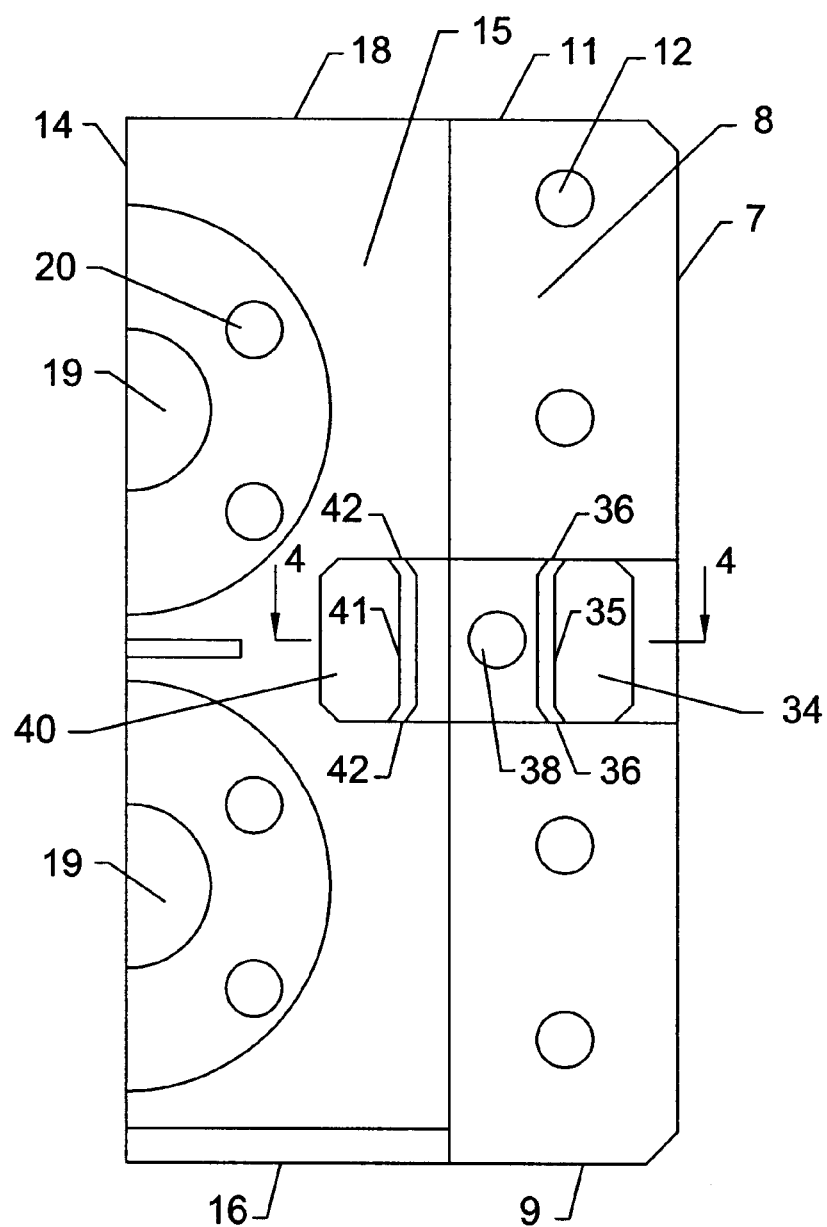
FIG. 2 is a top plan view of a blow mold half shell and its carrier plate prior to having a fastener clip passed into the corresponding slotted openings defined within the top edges thereof.
Figure 3A:
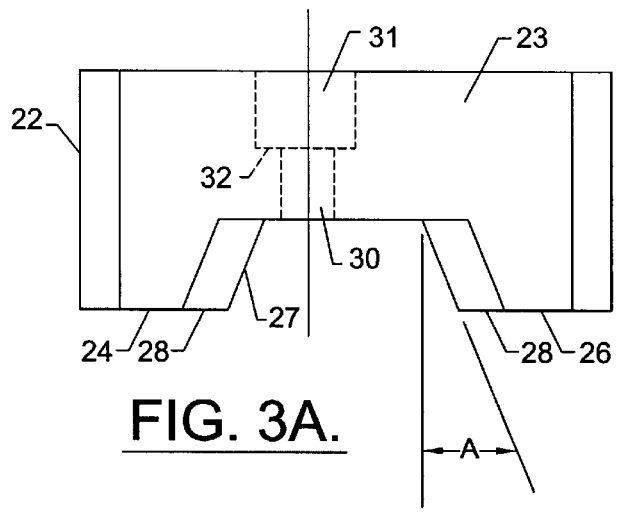
FIG. 3A is a side elevational view of a preferred embodiment of the fastener clip of this invention.
Figure 3B:
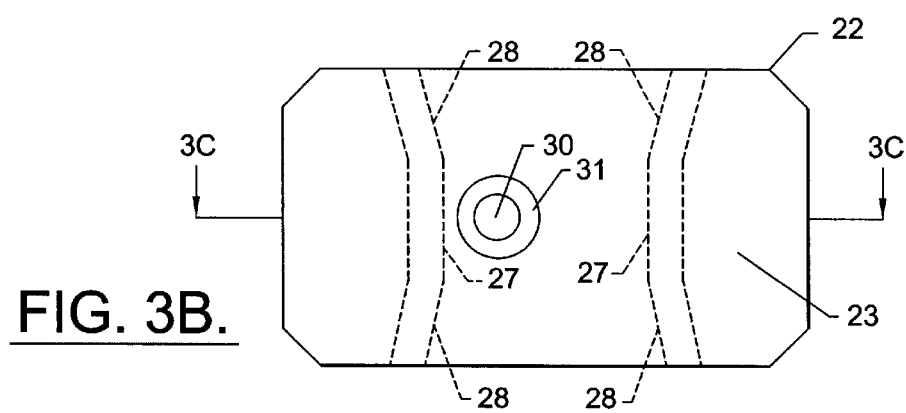
FIG. 3B is a top plan view of the fastener clip of FIG. 3A.
Figure 3C:
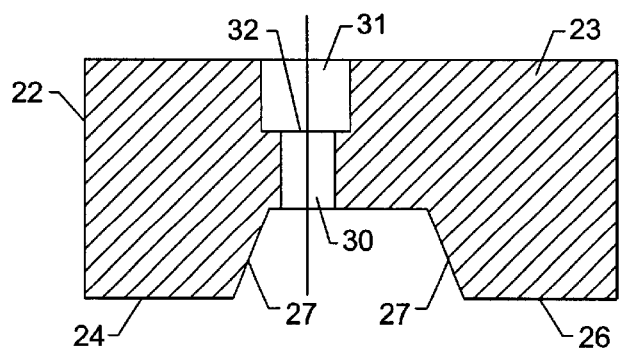
FIG. 3C is a side elevational cross-section view of the fastener clip of FIG. 3B taken along line 3C—3C.

Still referring to FIG. 1, the blow mold shell assembly also includes a pair of substantially identical blow mold half shells 14, each of which has a top edge 15, and pair of spaced parallel side edges 16, 18 extending downwardly away therefrom. As shown in FIGS. 1 and 2, the blow mold half shells 14 illustrated here have dual mold cavities 19 defined therein such that two containers may be blow molded simultaneously, as illustrated schematically and described in the '729 patent to Valles. It is anticipated that the invention may also be used with blow mold shells having only a single molding cavity, or blow mold shells having more than two molding cavities, as desired. In known fashion, a series of neck cooling fluid openings 20 are defined in the top edge of each blow mold half shell and in communication with suitable fluid conduits (not illustrated), such that a cooling or heat treating fluid can be circulated through the neck of the shell during the blow molding process.

As known to those of skill in the art, for example referring to FIG. 1 of the '729 patent to Valles, and the opening and closing mechanism of the '250 to Doudement, rotary blow mold machines provide the advantage of a high throughput such that the improved production efficiency demanded by modern stretch blow mold producers may be satisfied. A drawback with this type of clam shell opening and closing mechanism, however, occurs when it is desired to change the blow mold half shells from a first size, shape, or design, to a second size, shape, and/or design, for example from a dual cavity mold shell to a single cavity mold shell, as there typically is a very limited amount of space which is available for machine service technicians to remove the half shells and replace them with the appropriate half shells. This often times has to be done within a protective enclosure (not illustrated) in which the rotary blow mold machine is housed, compounding the difficulty in changing over the mold shells.

As the carrier plates are fastened to the opening and closing mechanism, by using suitable threaded fasteners (not illustrated), and are not adapted for being readily changed out themselves, what must be adapted for quick changeover, then, is the blow mold half shells. Most blow mold half shells, however, are affixed to their carrier plates by threaded fasteners which are either passed through the carrier plate and into the blow mold half shells, or by straps or other clamps passed across the outside surfaces of the half shell and its carrier plate. Although these provide a generally satisfactory means of affixing the blow mold half shells to their respective carrier plates, the problem still persists in that a limited amount of room is available for placing and removing the threaded fasteners within the carrier plates, half shells, and/or clamps or straps used. Moreover, once the half shells are removed and replaced, the precise re-alignment of the half shell with the carrier plate is necessary in order to align any cooling channels which may be defined in the carrier plate and which feed into or receive the discharge effluent from the half shell, in known fashion. If this precise alignment does not occur, the cooling fluid passed through the carrier plate in the blow mold half shell may leak, resulting in a less than adequate heat treatment of the parison during the blow mold process, or may unduly cool portions of the blow mold half shell which are not to be cooled, resulting in unsatisfactory containers.

With this as background, then, it is seen with reference to FIGS. 1–4 that fastener clip 22 in conjunction with first opening 34 defined in carrier plate 7, and second opening 40 defined in the blow mold half shell 14, provides a much simpler quick change blow mold shell assembly which can be quickly used to produced repeatedly accurate results in mounting blow mold half shells to their carrier plates during mold changeover operations. Fastener clip 22 is provided with a body portion 23 having a first leg 24 and a spaced second leg 26, both of which extend away therefrom in a common direction. As best shown in FIGS. 3A–3C, the first and second legs 24, 26 are parallel to one another, although they both have an inwardly facing tapered surface 27 extending in the lengthwise direction of each such leg, and a pair of beveled surfaces 28 extending along the lengthwise spaced, parallel side edges of the tapered surface. It is anticipated that the tapered surfaces 27 of each leg 24, 26 will have a taper angle, denoted by the reference character "A" in FIG. 3A, of 15°. The taper angle A may be greater or less than 15°, although 15° is preferred in this construction.

The fastener clip 22 also includes a continuous through-bore 30 defined therein such that an elongate threaded fastener 48 (FIG. 1) can be passed therethrough for affixing the fastener clip to one of carrier plates 7. A counterbore 31 is drilled within the outside end of the bore 30, such that a shoulder 32 is defined for seating the head of the fastener 48 thereon as the fastener clip is threadably affixed to its carrier plate 7.

Figure 4:
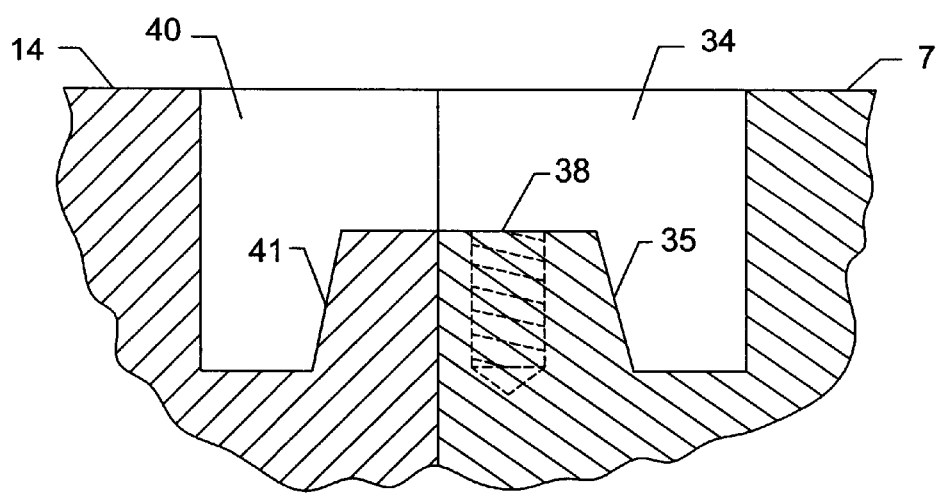
FIG. 4 is a partial cross-sectional side elevational view along line 4—4 of FIG. 2 illustrating the slotted openings defined in the carrier plates and half shells of the invention.

Referring now to FIGS. 2 and 4, a first slotted opening 34 is defined in carrier plate 7, and is best described as being an elongate or slotted opening formed in the top edge 8 of the carrier plate. The slotted opening 34 has a tapered surface 35 which is sized and shaped complimentarily to the tapered surfaces 27 on the legs of the fastener clip 22. In similar fashion, a pair of spaced parallel beveled surfaces 36 are defined along the opposite sides of the tapered surface 35. A fastener opening, preferably a threaded opening, is defined within the first slotted opening 34 and within carrier plate 7 for receiving fastener 48 therein.

A second slotted opening 40 is defined in the top edge 15 of the blow mold half shell 14. In the same fashion as does first opening 34, second opening 40 includes a tapered surface 41 which is the sized complimentarily to the tapered surfaces 27 of the legs 24, 26 of the fastener clip 22, and has a pair of spaced parallel beveled surfaces 42 formed along the opposite sides of tapered surface 41, and extending in the lengthwise direction of the second opening 40.

So constructed, and as best shown in FIG. 1, fastener clip 22 is positioned with its first leg 24 in first slotted opening 34, and a second leg 26 in second slotted opening 40, as an elongate threaded fastener 48 is passed through the bore 30 and received within the threaded opening 38 defined in the carrier plate. As this occurs, the tapered surfaces 27 of the fastener clip are received on the tapered surfaces 35, 41, respectively of the first and second slotted openings 34, 40. The fastener clip is thus threadably affixed to the carrier plate to securely fasten the blow mold half shell to its respective carrier plate. Simultaneously, the beveled surfaces 28 on the first and second legs of the fastener clip are also received on the beveled surfaces 36, 42 of the first and second openings, respectively. The construction of the respective tapered surfaces and beveled surfaces on the legs of the fastener clip, and of the openings in the carrier plate and half shell together act to align the first and second openings with respect to one another to ensure that any cooling ports defined within the blow mold half shell and/or the carrier plate become aligned, and to also draw the blow mold half shell snugly against its respective carrier plate such that it is held rigidly there against once the fastener clip has been threadably secured to the carrier plate 7.

Although reference is made with respect to the fastening of a fastener clip 22 along the respective top edges 8, 15 of a carrier plate 7 and a blow mold half shell 14, it is understood by those skilled in the art, and as shown in FIG. 1, that a series of first and second openings 34 and 40 may be defined along the side edges 9, 11 of the carrier plates 7, and the side edges 16, 18, of the blow mold half shell 14, respectively, with identical ones of the fastener clips 22 placed therein, such that the blow mold half shell is fixedly secured to its carrier plate along the periphery of both the half shell and the carrier plate.

As shown in FIG. 1, as well as in FIG. 4, the fastener clip 22 may be sized and shaped such that as it is passed into the openings 34, 40 defined within the carrier plate and half shell respectively, it may be received substantially flush therein, or may even be recessed with respect to these edges. Similarly, and as also shown in FIG. 1, if desired, the fastener clip 22 may be received on the abutting edges of the blow mold half shell and its carrier plate, for example on side edge 16 of the blow mold half shell and side edge 9 of its corresponding carrier plate.

Still referring to FIG. 1, the blow moldshell assembly is shown closed about a known type of base assembly 44, provided with a pedestal 45 on which a base 46, or "crown", portion of the blow mold shell assembly is provided. As is known, in operation the opening and closing device of the '250 patent to Doudement will open the blow mold shells for receiving preheated parisons therein and for ejecting the completed, i.e. molded, container. As the opening and closing mechanism begins to close the blow mold half shells on one another for defining, at least partially, the container, the pedestal 45 is simultaneously moved upward such that the base portion 46 of the mold becomes engaged on the bottom surfaces (not illustrated) of the respective half shells, the half shells being constructed and arranged, in known fashion, to be closed about the base portion 46 for defining a substantially closed blow mold.

Although it is not shown in FIG. 1, it is anticipated that the quick change blow mold shell construction described hereinabove with reference to the blow mold half shells 14 and carrier plates 7, may be used with respect to pedestal 45 and base portion 46 for securing the base portion to its pedestal, this making it even easier still to change over blow mold shell assemblies when needed.

It will be appreciated that many modifications and other embodiments of the invention will come to mind to those skilled in the art to which this invention pertains, having the benefit of the teachings presented in the foregoing description and the associated drawings. It is understood, therefore, that the invention is not to be limited to the specific embodiments disclosed herein, and that many modifications and other embodiments of the invention are intended to be included within the scope of the appended claims. For example, although a construction of the fastener clip having a tapered surface and a pair of beveled side edges is disclosed, the bevels may be provided, or may be dispensed with as desired, and the angle of taper may be increased, or decreased, as desired. Also, although specific terms are employed herein, they are used in a generic and descriptive sense only and not for the purposes of limiting the described invention, or the claims which follow.

I claim:

1. A blow mold shell assembly, comprising:
   a carrier plate;
   a first opening defined in an edge of said carrier plate;
   a blow mold shell;
   a second opening defined in an edge of said shell;
   said first and second openings being placed in registry with one another as said shell is positioned on said carrier plate; and
   a fastener clip sized and shaped to be received in said openings, said clip being constructed and arranged to align said first and second openings with respect to one another while drawing said shell snugly against said carrier plate as a fastener is passed through said clip and into said carrier plate, and to fasten the shell to its carrier plate.

2. The blow mold shell assembly of claim 1, wherein said fastener clip is substantially U-shaped and has a first leg and a second leg spaced apart from said first leg.

3. The blow mold shell assembly of claim 2, wherein said first leg is received within said first opening and said second leg is received within said second opening, and wherein said clip extends across the edges of said carrier plate and said blow mold shell, respectively.

4. The blow mold shell assembly of claim 2, wherein each said leg extends in a lengthwise direction away from a body portion of said clip, and is tapered in its lengthwise direction.

5. The blow mold shell assembly of claim 4, wherein each said leg is tapered at an angle of approximately 15 degrees.

6. The blow mold shell assembly of claim 4, wherein each said leg is beveled along its edges in said lengthwise direction.

7. The blow mold shell assembly of claim 6, wherein each of said first and said second openings has a tapered surface sized complimentarily to the taper of each respective leg of said clip received therein, each said tapered surface also being complimentarily beveled along its edges so that said clip progressively aligns said first and second openings with respect to one another and progressively draws the shell and the carrier toward one another as said fastener is passed therethrough and into the carrier plate.

8. The blow mold shell assembly of claim 1, wherein said shell comprises a dual molding cavity half-shell.

9. The blow mold shell assembly of claim 1, wherein said first opening comprises a plurality of first openings, wherein said second opening comprises a corresponding number of second openings, and wherein said fastener clip comprises a corresponding number of fastener clips.

10. The blow mold shell assembly of claim 1, wherein said first opening further comprises a first recessed slot and said second opening further comprises a second recessed slot.

11. The blow mold shell assembly of claim 1, said clip having an elongate bore defined therein and extending therethrough for receiving said fastener, and an annular shoulder defined within said bore for abutting the fastener as the fastener is passed into the carrier plate.

12. The blow mold shell assembly of claim 1, wherein said fastener comprises a threaded fastener.

13. A blow mold shell assembly for use with a blow mold machine, said blow mold shell assembly comprising:
   a planar carrier plate having a top edge and two parallel side edges extending from said top edge;
   a first slotted opening defined in the top edge of said carrier plate;
   a blow mold half shell having a top edge and two parallel side edges extending from the top edge thereof;
   a second slotted opening defined in the top edge of said shell;
   said first and second openings being placed in approximate registry with one another as said shell is positioned on said carrier plate; and
   a fastener clip sized and shaped to be received in said openings, said clip being constructed and arranged to align said openings with respect to one another and to draw said shell snugly against said carrier plate as a fastener is passed through said clip and into said carrier plate for fastening the half shell to the carrier plate.

14. The blow mold shell assembly of claim 13, wherein said clip extends across the top edge of said carrier plate and the top edge of said half shell within said first and second openings, respectively, and fits substantially flush therein with respect to said top edges.

15. The blow mold shell assembly of claim 13, further comprising:
   at least a third slotted opening defined in one of the side edges of said carrier plate;
   at least a fourth slotted opening defined within the corresponding side edge of said half shell; and
   at least a second one of said fastener clips for being received within each said at least a third opening and each said at least a fourth opening, respectively, so that said at least a second one of said fastener clips aligns each said at least a third opening with each said at least a fourth opening, respectively, and draws said shell snugly against said carrier plate as at least a second one of said fasteners is passed through said at least a second clip and into said carrier plate.

16. A blow mold shell assembly for use with a blow mold machine, the blow mold machine having a clamshell style blow mold shell opening and closing mechanism to which said blow mold shell assembly is mounted, said blow mold shell assembly comprising:
   first and second carrier plates, each said carrier plate being adapted to be separately affixed to the shell opening mechanism of the blow mold machine;
   first and second blow mold half shells for being separately and removably fastened to each said carrier plate, respectively;
   a first slotted opening defined in a top edge of each said carrier plate;
   a second slotted opening defined in a top edge of each said half shell;
   said first and second openings being placed in registry with one another as each respective shell is placed on its respective carrier plate; and
   a fastener clip for each pair of said first and second openings, respectively, each said clip being sized and shaped to be received in both of the openings of each said pair of openings and being constructed and arranged to draw each said half shell snugly against its respective carrier plate as a separate fastener is passed through each said clip and into its respective carrier plate, and to fasten the half shell to its respective carrier plate.

17. The blow mold shell assembly of claim 16, wherein each said fastener clip is substantially U-shaped and has a first leg tapered in its lengthwise direction and a second spaced leg tapered in its lengthwise direction, each said leg also being beveled along its edges in said respective lengthwise directions.

18. The blow mold shell assembly of claim 17, wherein said first leg is received within said first opening and said second leg is received within said second opening, and wherein each of said clips extends across the top edges of its carrier plate and half shell, respectively.

19. The blow mold shell assembly of claim 17, wherein each said leg is tapered in its lengthwise direction at an angle of approximately 15 degrees.

20. The blow mold shell assembly of claim 17, wherein each of said first and said second openings has a tapered surface sized complimentarily to the taper of the respective leg of said clip received therein, and wherein each said tapered surface is also beveled along its edges in said lengthwise direction so that the respective fastener clips progressively align said first and second openings with respect to one another, and progressively draw the respective shells and carrier plates toward one another as each said fastener is passed into its respective carrier plate.

21. The blow mold shell assembly of claim 17, further comprising:
   a pair of parallel side edges extending from the top edge of each said carrier plate;
   a pair of parallel side edges extending from the top edge of each said half shell;
   at least one third slotted opening defined in one of the side edges of each said carrier plate;
   at least one fourth slotted opening defined within the corresponding side edge of each said half shell; and
   one of said fastener clips for each pair of said third and fourth slotted openings, respectively, so that each said fastener clip aligns each said pair of slotted openings with respect to one another and draws each respective half shell snugly against its carrier plate as one of said fasteners is passed through each said clip and into the respective side edges of said carrier plates.

22. The blow mold shell assembly of claim 16, further comprising a removable base portion, each of said half shells being sized and shaped to be closed about said base portion for defining a substantially closed blow mold assembly.

23. The blow mold shell assembly of claim 7, wherein said clip progressively releases said shell from said carrier plate as said fastener is withdrawn through said clip and out of said carrier plate.

24. The blow mold shell assembly of claim 9, wherein said fastener clip is substantially U-shaped and has a first leg and a second leg spaced apart from said first leg.

25. The blow mold shell assembly of claim 24, wherein said first leg is received within said first recessed slot and said second leg is received within said second recessed slot such that said clip extends across the edges of said carrier plate and said blow mold shell, respectively.

26. The blow mold shell assembly of claim 1, said carrier plate having a threaded opening therein for receiving said fastener.

27. The blow mold shell assembly of claim 17, wherein said clip progressively releases said shell and said carrier plate as said fastener is withdrawn through said clip and out of said carrier plate.

28. A system for assembling a blow mold shell assembly, said assembly characterized by a mold shell having a rear face and a carrier plate having a mounting face, said system comprising:

a means for fastening said mold shell to said carrier plate;

a first means for receiving said fastening means in an edge of said mounting face of said carrier plate; and a second means for receiving said fastening means in an edge of said rear face of said mold shell, said fastening means comprising:

a means for aligning said first receiving means and said second receiving means along a mating surface generally defined by said rear face and said mounting face;

a means for progressively drawing together said mold shell and said carrier plate; and a means for securing said fastening means.

29. The system of claim 28 wherein said securing means comprises a threaded fastener, said fastening means further comprising:

a means for placing said securing means through said aligning means along a fastener axis; and a means for receiving said securing means in said carrier plate along said fastener axis.

30. The system of claim 28, wherein said aligning means further comprises:

a first means for inserting said aligning means into said first receiving means, said first inserting means being tapered at a first taper angle with respect to said mating surface and beveled along the length of its edges; and a second means for inserting said aligning means into said second receiving means, said second inserting means being tapered at a second taper angle with respect to said mating surface and beveled along the length of its edges.

31. The system of claim 30, wherein said aligning means further comprises:

a first means for guiding said first inserting means, said first guiding means having at least a first bearing wall nearest said mating surface and a first back wall, said first bearing wall being tapered at said first taper angle and beveled along the length of its edges, said first bearing wall sized to compliment said first inserting means of said aligning means; and a second means for guiding said second inserting means, said second guiding means having at least a second bearing wall nearest said mating surface and a second back wall, said second bearing wall being tapered at said second taper angle and beveled along the length of its edges, said second bearing wall sized to compliment said second inserting means of said aligning means.

* * * * *